United States Patent [19]

Looker

[11] 4,170,271
[45] Oct. 9, 1979

[54] STEERING SYSTEM FOR PERSONNEL CARRIER

[76] Inventor: Olin L. Looker, c/o The Row Runner Co., Box 29, Milford, Ill. 60953

[21] Appl. No.: 858,737

[22] Filed: Dec. 8, 1977

[51] Int. Cl.² ............................................. B62D 61/08
[52] U.S. Cl. .................................... 180/211; 280/265
[58] Field of Search .................... 180/26 R, 13, 77 S, 180/25 R, 27, 52; 280/32.5, 87.1, 92, 265, 266

[56] References Cited

U.S. PATENT DOCUMENTS

| D. 212,415 | 10/1968 | Siems | D15/23 |
|---|---|---|---|
| 380,770 | 4/1888 | Schiermeyer | 280/265 X |
| 2,660,447 | 11/1953 | Bear | 280/87.1 |
| 3,771,618 | 11/1973 | Ekas | 180/52 |
| 3,910,368 | 10/1975 | Weber | 180/26 R |
| 3,920,093 | 11/1975 | Moran | 280/266 |

FOREIGN PATENT DOCUMENTS 71930 12/1950 Denmark ............................... 180/26 R

*Primary Examiner*—David M. Mitchell
*Assistant Examiner*—Edmond G. Rishell, Jr.
*Attorney, Agent, or Firm*—Wegner, Stellman, McCord, Wiles & Wood

[57] ABSTRACT

A steering system for a personnel carrier of a relatively slow moving type, useful for carrying farmers through grain fields performing manual weed-removal functions. The steering system utilizes a foot movable pallet conveniently positioned for engagement by feet of a seated, carried person. Drive cables from a shaft supporting the pallet to anchor positions connecting with the carrier frame are provided so that turning the pallet may turn a steerable wheel or wheels of the carrier.

6 Claims, 6 Drawing Figures

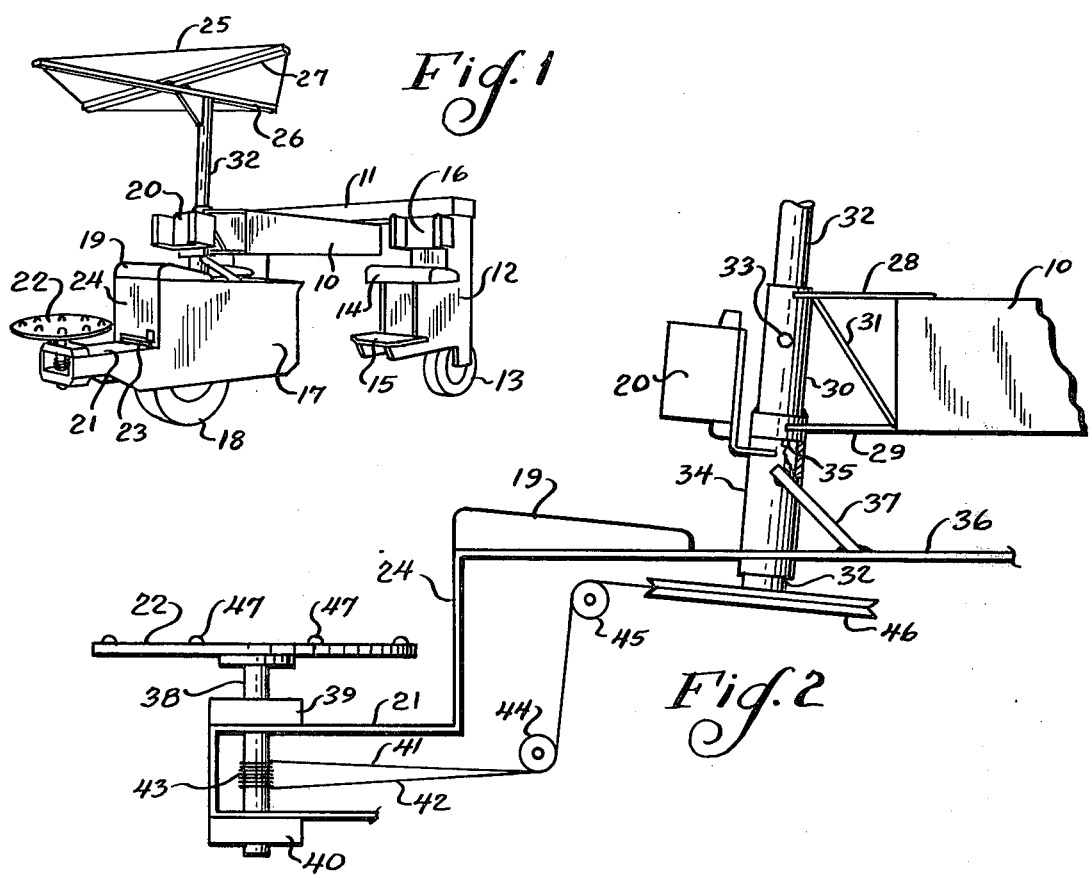
Fig. 1
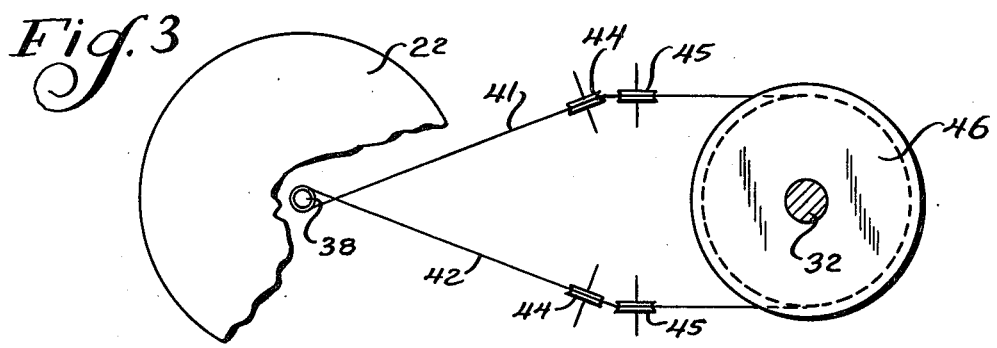
Fig. 2
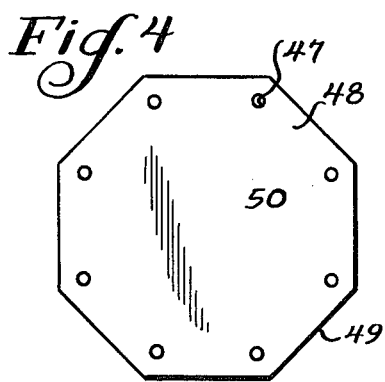
Fig. 3
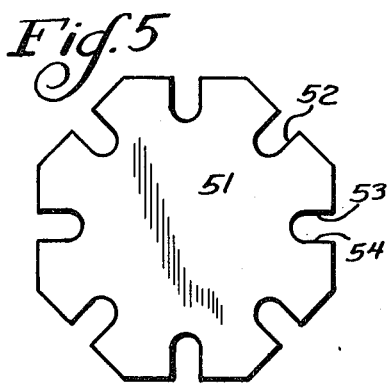
Fig. 4
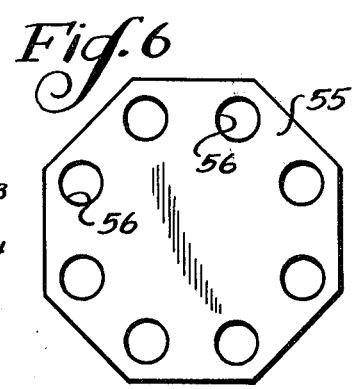
Fig. 5
Fig. 6

STEERING SYSTEM FOR PERSONNEL CARRIER

BACKGROUND OF THE INVENTION

Certain grain crops, such as soybeans, need to be weeded before harvesting, and this job traditionally has been done manually. A farmer walks between the rows of his crop chopping down weeds with a hoe-type implement. The job done during daylight hours, generally under hot sunlit conditions, is at best tiring and difficult.

It has been proposed to motorize the weeding operation, in part, by the use of a buggy, cart or personnel carrier, light in weight and powered by a small gasoline engine equipped to allow the farmer to sit thereon and be carried through the field in a position to reach the weeds with a hoe without dismounting. Such devices have removed a portion of the physical effort from the task, but have had drawbacks from the standpoint that the propelling of the vehicle, if the farmer is alone, either decreases his ability to do a fast and adequate weeding job, or allows the vehicle to veer off path between the rows and damage the growing crop. The buggy or carrier is utilized only in those instances where mechanized farmer-tractor driven equipment cannot do an adequate job of weeding so that the job must be done by hand. One such carrier is disclosed in U.S. Pat. No. 3,910,368.

There has existed a need to ease the function of steering the vehicle while concentrating upon the primary function of weed removal in a growing crop field. There has also been a need to provide a responsive steering system which will little affect the main task being performed by the rider of the carrier. There has further been a need to free the farmer rider of such a carrier to the extent that his hands and upper torso may be concentrated upon the task of removing weeds in the field, while requiring little attention to the directional control of the buggy upon which he is riding.

SUMMARY OF THE INVENTION

The principal object of this invention is to provide a new improved steering system for a person carrier.

Another object is to provide a responsive, easily controlled steering mechanism operable solely by foot movements without hand-applied force.

Another object is to provide a foot-controlled steering system for the movement of a three-wheeled vehicle having but one steerable wheel housed in a fashion to support a person thereon capable of such control of the system.

Another object is to provide a personnel carrier with a foot-operable steering system, but requiring no more force than is readily available by push and pull forces obtainable from a seated person's feet without disturbing his seated position.

A further object is to provide a steering system for foot-applied forces having a particular pallet of design, configuration and shoe engageable surfaces easily controlled by a person's foot-applied forces.

DESCRIPTION OF THE DRAWINGS

FIG. 1 is a perspective view of a personnel carrier incorporating the present inventive steering system;

FIG. 2 is a fragmentary, partially diagrammatic view in side elevation, of a portion of the steering system utilized in the vehicle of FIG. 1;

FIG. 3 is a broken, partially diagrammatic plan view of the system illustrated in FIG. 2; and FIGS. 4, 5 and 6 are alternate structures of the steering pallet illustrated in FIGS. 1 and 2 as part of the steering system.

DESCRIPTION OF THE PREFERRED EMBODIMENT

With particular reference to FIG. 1, a personnel carrier suitable for carrying a farmer through a soybean field is illustrated. The carrier has a rear trailing main frame consisting of fore-and-aft mast 10 of box construction over which there extends a cross frame member 11 having at each end a downwardly extending box section 12 supporting an idler wheel 13. The box section 12 may contain a seat 14 with a footrest 15 therebelow and a backrest 16 thereabove upon which a person other than the driver of the vehicle may sit in position to remove weeds between two adjacent rows of soybeans, for example. A similar upright frame to that illustrated at 12 may occupy the opposite hidden end of the cross frame member 11 and having a similar idler wheel 13. The spacing between the idler wheels is such as to ordinarily track centrally between the rows of a soybean crop.

The frame of the mast may preferably be constructed of materials to ensure its integrity, but yet be light in weight. In the particular carrier illustrated, the box sections of the frames 10, 11 and 12 are each readily constructable of a plywood mounted to a minimal amount of wooden underframe members.

The driving force for the carrier is provided by a small horsepower gasoline engine, 15 h.p. being adequate, mounted within the rear of a boxed housing 17 and connected through a belt reduction drive to a driven rubber tired wheel 18. The box section has upon it a seat 19 below a backrest 20 upon which the driver and rider may sit. A platform 21 extends forwardly of the seat 19 and supports a steering pallet 22. The platform 21 and pallet are so positioned relative to the seat 19 that a farmer sitting upon the seat in a normal and usual fashion would find his feet resting upon the platform or, if extended forward slightly, upon the steering pallet 22. A clutch control bar 23 is positioned at the lower edge of the front panel 24 of the motor housing in position to be engaged by the shoe heel of a person seated upon the seat 19. The clutch control 23 is required to be depressed in order to engage the belt drive from the motor (not shown) to the drive wheel 18.

All of the seats on the carrier are at a height above ground that a person may physically move himself on to the seat without having to step up. This height will place the person relative to the growing crop in approximately the proper position to be able to chop weeds from between the grain plants as the carrier moves forwardly through the field between the growing rows. The speed of movement preferably is about that of walking speed, in the area of 3 to 4 m.p.h. Should the farmer encounter a multitude of weeds to be chopped, he merely needs release his heel pressure from the clutch control 23 whereupon the carrier will stop although the motor continues to run. Depressing the control will immediately start the carrier forwardly again.

A sun shield 25 is shown as mounted above the front seat 19 on the carrier so as to shield the person on such seat. The shield has a front-to-rear spar 26 which remains aligned with the front-to-rear box section 10 of the frame and, being immediately above the driver's head, provides an additional reference to the direction of the carrier even though the rider's attention is concentrated on the ground and his weed removal functions. The shield conveniently may be made of canvass stretched over the spar 26 and a side-to-side spar 27.

The steering system is best illustrated in FIGS. 2 and 3 wherein it may be noted that the front-to-rear box frame section 10 has a top metal plate 28 and a bottom metal plate 29, each welded to a sleeve member 30 and rendered rigid in its connection between the frame 10 and sleeve by a cross brace 31. The sleeve has pinned an upwardly extending mast 32 which remains stationary with the trailing frame by virtue of the pin 33 extending both through the sleeve and the mast. The mast serves the support the sun shield 25 and also to provide a support for the steerable motor and driven wheel housing.

Below sleeve 30 is a sleeve 34 which bears upwardly against the sleeve 30 at an interface 35. The mast 32 extends downwardly through the sleeve 34 in a bearing support fashion, which may be provided with a lubricant fitting, so that the turning of the motor housing relative to the mast may easily occur.

The steerable motor housing has a top plate 36 with a welded metal brace 37 to the sleeve 34 so that the relationship physically of sleeve 34 and motor housing is maintained. Seat 19 is placed upon the forward portion of the motor housing and the backrest 20 is supported from the sleeve 34 so that the seat, backrest and motor housing turn as a unit.

Steering is effected by rotation of the pallet 22 through its secured shaft 38 which extends upwardly through bearing box 39 and 40 at the front of the foot platform 21. Cable means involving a cable length 41 and another cable length 42, each wrapped about the shaft with a number of turns at 43, extend rearwardly over pulleys 44 and 45 upwardly in the motor housing so that the respective cable lengths may be secured to a relatively large sheave 46 secured immovably to the mast 32. As may be observed in FIG. 3, the cable portion 41 passes to the right-hand side of the motor housing around pulley 44 and then upwardly to pulley 45 to the right-hand edge of the sheave 46. Similarly, the cable portion 42 passes to the left-hand side of the motor housing over similar pulleys 44 and 45 to the left-hand side of the sheave. The cable may be separate lengths, or one length, with both ends secured to the sheave 46. The cable lengths cross each other in moving from the pulleys 44 to the pallet shaft 38 so that the clockwise movement of the pallet, as viewed from above, provides a turning of the driven motor wheel housing to the right and vice versa.

It has been found that a convenient and easily operable control over the vehicle, maintaining it between the rows of the crop, now quite easily may occur with about a 9:1 ratio in the steering system. For about 90° of turning of the steering pallet, 10° of motion of the engine compartment relative to the trailing frame may occur. There is a necessity for turning the entire vehicle around at the end of the field in order to proceed back over the field between adjacent rows of crop. This can readily be accomplished by providing about 1½ revolutions of the steering pallet, which can result in about 63° of turning of the motor housing relative to the trailing frame.

One particular advantage of the present construction is that the force that need be applied by the driver of the vehicle with his feet in order to effect turning is quite small, and certainly no more than what a person can usually apply by moving his foot forwardly and rearwardly while seated. No particular force has to be exerted except that from the muscles of the lower leg, from the knee down. A particular configuration of the steering pallet has been found to ease the job of steering and to ensure that steering contact is made by the shoe of the rider and the pallet. In FIGS. 1 and 2, a round pallet 22 of plywood with upstanding ½" high knobs 47 about 45° apart about the periphery of the pallet is illustrated. This form of obstruction provides a surface on the pallet for engaging a shoe of a person and has, in certain instances, proved quite adequate. It has been found advantageous to form the pallet as shown in FIG. 4 in certain instances where the outer periphery 48 is octagonal, as shown, with upstanding knobs 47 located at the corners of the octagonal shape. The heel of the rider can be applied to the outer peripheral surface 49 on certain instances, as well as to the upper flat surface 50 of the pallet.

Other forms of pallet found easier for some persons to maneuver with their feet without particularly looking at the action occurring are shown in FIGS. 5 and 6. In FIG. 5, the pallet 51 is generally octagonal in shape, but has a notch 52 extending about 30% of the way from the outer periphery toward the center of the pallet, the notch being cut clear through the thickness of the plywood used to make the pallet. ½" thick material has been found adequate. The notches provide surfaces, such as 53 and 54, substantially a right angles to the direction the pallet should be pushed or pulled by the feet of the driver. Heels and toes of the shoes being worn can provide a means for engaging the pallet so that these surfaces assist in moving the pallet with the feet.

In FIG. 6, a pallet 55 is shown with circular cutouts 56 opposite the apices of the octagonal shape of the pallet. The holes are cut clear through the ½" plywood of the pallet and are of sufficient size that a heel or toes may be pressed therein so that the inner surface about the opening can provide a shoe engageable surface for steering purposes.

While the personnel carrier has been described in detail relative to the performance of a weeding function in a growing grain crop field, the principles of the steering system are equally applicable to other vehicles for diverse purposes. It has been found that the underfoot system of the present structure is so easily operated that the driver can practically pay no attention to his steering function except that occasional correction of vehicle direction to avoid running over the growing crop. His entire attention may be left to the main job of operating an implement by hand to chop out the weeds. In certain instances, a spray tank of weed retardant chemical may be supported on the main frame of the carrier, and the driver can spray the weeds with a hand-held wand.

The steering is preferably accomplished entirely by the wrapping and unwrapping of the cable about the shaft 38 to which the pallet is rigidly fixed. As may be observed, turning of the pallet turns the shaft, winding one or the other of the cable lengths 41 and 42 onto the shaft pulling the entire turnable and swingable motor housing to the left or to the right, as the case may be. The anchor position for the cables on the sheave 46 being stationary with the trailing frame causes the motor housing to turn when the pallet is rotated. The invention is equally applicable to a system in which the driver's feet may be supported from the frame rather than on the motor housing. In such instances, the pallet will swing to the left or to the right of the straight-forward position of the rider, but otherwise the action described will be the same.

I claim:

1. A steering system for a three-wheeled personnel carrier having a frame equipped with idler ground engaging support wheels and a motor driven wheel and housing support pivotally mounted to the frame, comprising:

a personnel seat supported on the driven wheel housing support, a platform on said housing support below said seat and extending outwardly therefrom to receive the feet of a person seated on said seat, a steering pallet joined to an upright shaft journalled in said platform, said pallet being positioned below the seat for engagement by the feet of a person in conventional seated position on said seat, driven members secured both to said pallet shaft and a portion of said frame so that foot-induced rotary motion of the pallet may pivot the motor driven wheel relative to the frame for foot controlled steering of the personnel carrier while leaving the seated person's hands free.

2. A steering system as set forth in claim 1 wherein said driven members comprise a pair of cable lengths respectively secured to said pallet shaft and to said carrier frame whereby wrapping and unwrapping of said cable lengths about the pallet shaft may swing the driven wheel housing and wheel relative to the carrier frame.

3. A steering system as set forth in claim 1 wherein said steering pallet has an upper surface exposed to the feet of a person seated on said seat, said surface including shoe engageable surface portions for foot-controlled turning motion of the pallet by a person seated on said seat.

4. A personnel carrier for use in traversing a growing crop field for weed removal without walking, comprising:

a lightweight frame having a row straddling rear portion with spaced ground-engaging trailer wheels, a motor driven ground engaging wheel having a support pivoted to the frame forwardly and between the trailer wheels providing three-point stability for the carrier, a personnel seat mounted on the driven wheel support, and means for seated-thereon personnel to steer the carrier while leaving hands free for weed removal as the carrier traverses a field, including a rotatable pallet on the driven wheel support at foot engageable position by a person seated in said seat, said pallet having a driving connection to said frame for pivoting the driven wheel and support relative to the frame responsive to pallet rotation by personnel-foot applied motion.

5. Foot-operated steering mechanism for a steerable personnel motorized carrier having a frame, at least one driven ground-engaging wheel and spaced ground-engaging wheels for stabilizing the carrier and its personnel load, comprising:

a housing, said driven wheel secured within said housing and said housing being swingably mounted relative to said carrier frame, a seat upon the carrier for personnel to be transported, a platform below and extending forward of the seat in position to rest the feet of a person seated conventionally on said seat, said seat and platform being supported upon and swingable with said housing, a steering pallet rotatably supported on the platform in position for easy engagement by the foot of said seated person, and means responsive to rotation of said pallet for wheel steering movement of sufficient of said carrier ground-engaging wheels to effect motion direction of the carrier, whereby the carrier may be steered by foot motion leaving said personnel's hands free.

6. Steering mechanism as specified in claim 5 wherein said steering pallet is secured upon a rotatable shaft, cable means connects said shaft and carrier frame with cable portions wrapped about the shaft so that turning of the pallet and its shaft can take in and play out portions of the cable means to turn the driven wheel relative to the carrier frame.

* * * * *